US009930055B2

(12) United States Patent
Ricafort et al.

(10) Patent No.: US 9,930,055 B2
(45) **Date of Patent: *Mar. 27, 2018**

(54) UNWANTED TUNNELING ALERT SYSTEM

(71) Applicant: Palantir Technologies Inc., Palo Alto, CA (US)

(72) Inventors: Juan Ricafort, New York, NY (US); Harkirat Singh, New York, NY (US); Philip Martin, San Jose, CA (US)

(73) Assignee: Palantir Technologies Inc., Palo Alto, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 15/228,297

(22) Filed: Aug. 4, 2016

(65) Prior Publication Data

US 2016/0344756 A1 Nov. 24, 2016

Related U.S. Application Data

(63) Continuation of application No. 14/823,935, filed on Aug. 11, 2015, now Pat. No. 9,419,992.

(Continued)

(51) Int. Cl.
*H04L 29/06* (2006.01)
*H04L 29/12* (2006.01)
*G06F 21/55* (2013.01)

(52) U.S. Cl.
CPC ...... *H04L 63/1416* (2013.01); *H04L 61/2007* (2013.01); *H04L 63/0272* (2013.01);
(Continued)

(58) Field of Classification Search
None
See application file for complete search history.

(56) References Cited

U.S. PATENT DOCUMENTS 5,978,475 A 11/1999 Schneier et al.
6,253,203 B1 6/2001 O'Flaherty et al.
(Continued)

FOREIGN PATENT DOCUMENTS

CN 101729531 6/2010
CN 103281301 9/2013
(Continued)

OTHER PUBLICATIONS

Notice of Allowance for U.S. Appl. No. 15/224,443 dated Dec. 19, 2016.

(Continued)

*Primary Examiner* — Brandon S Hoffman
(74) *Attorney, Agent, or Firm* — Knobbe Martens Olson & Bear LLP

(57) ABSTRACT

Various systems and methods are provided that detect malicious network tunneling. For example, VPN logs and data connection logs may be accessed. The VPN logs may list client IP addresses that have established a VPN connection with an enterprise network. The data connection logs may list client IP addresses that have requested connections external to the enterprise network and remote IP addresses to which connections are requested. The VPN logs and the data connection logs may be parsed to identify IP addresses that are present in the VPN logs as a client IP address and in the data connection logs as a remote IP address. If an IP address is so present, user data and traffic data associated with the IP address may be retrieved to generate a risk score. If the risk score exceeds a threshold, an alert to be displayed in a GUI is generated.

20 Claims, 7 Drawing Sheets

Related U.S. Application Data

(60) Provisional application No. 62/036,999, filed on Aug. 13, 2014.

(52) U.S. Cl.
CPC ...... *H04L 63/1425* (2013.01); *H04L 63/1441* (2013.01); *G06F 21/556* (2013.01)

(56) References Cited

U.S. PATENT DOCUMENTS

| | | | |
|---|---|---|---|
| 6,725,240 | B1 | 4/2004 | Asad et al. |
| 6,807,569 | B1 | 10/2004 | Bhimani et al. |
| 7,013,395 | B1 | 3/2006 | Swiler et al. |
| 7,017,046 | B2 | 3/2006 | Doyle et al. |
| 7,069,586 | B1 | 6/2006 | Winneg et al. |
| 7,225,468 | B2 | 5/2007 | Waisman et al. |
| 7,287,689 | B2 | 10/2007 | Tidwell et al. |
| 7,472,421 | B2 | 12/2008 | Cummins |
| 7,596,285 | B2 | 9/2009 | Brown et al. |
| 7,770,032 | B2 | 8/2010 | Nesta et al. |
| 7,801,871 | B2 | 9/2010 | Gosnell |
| 7,962,495 | B2 | 6/2011 | Jain et al. |
| 8,181,253 | B1 | 5/2012 | Zaitsev et al. |
| 8,190,893 | B2 | 5/2012 | Benson et al. |
| 8,196,184 | B2 | 6/2012 | Amirov et al. |
| 8,239,668 | B1 | 8/2012 | Chen et al. |
| 8,295,898 | B2 | 10/2012 | Ashfield et al. |
| 8,301,904 | B1 | 10/2012 | Gryaznov |
| 8,312,546 | B2 | 11/2012 | Alme |
| 8,321,958 | B1 | 11/2012 | Fleming et al. |
| 8,434,150 | B2 | 4/2013 | Xie et al. |
| 8,533,319 | B2 | 9/2013 | Draugelis |
| 8,646,080 | B2 | 2/2014 | Williamson et al. |
| 8,683,322 | B1 | 3/2014 | Cooper |
| 8,726,379 | B1 | 5/2014 | Stiansen et al. |
| 8,769,412 | B2 | 7/2014 | Gill et al. |
| 8,782,794 | B2 | 7/2014 | Ramcharran |
| 8,789,140 | B2 | 7/2014 | Williams et al. |
| 8,881,288 | B1 | 11/2014 | Levy et al. |
| 8,904,506 | B1 | 12/2014 | Canavor et al. |
| 8,931,043 | B2 | 1/2015 | Cooper et al. |
| 9,009,827 | B1 | 4/2015 | Albertson et al. |
| 9,021,260 | B1 | 4/2015 | Falk et al. |
| 9,049,117 | B1 | 6/2015 | Nucci et al. |
| 9,100,428 | B1 | 8/2015 | Visbal |
| 9,319,419 | B2 | 4/2016 | Sprague et al. |
| 9,335,897 | B2 | 5/2016 | Goldenberg |
| 9,338,013 | B2 | 5/2016 | Castellucci et al. |
| 9,401,925 | B1 | 7/2016 | Guo et al. |
| 9,407,652 | B1 | 8/2016 | Kesin et al. |
| 9,419,992 | B2 | 8/2016 | Ricafort et al. |
| 9,537,880 | B1 | 1/2017 | Jones et al. |
| 9,576,119 | B2 | 2/2017 | McGeehan et al. |
| 9,628,500 | B1 | 4/2017 | Kesin et al. |
| 2002/0112157 | A1 | 8/2002 | Doyle et al. |
| 2004/0123139 | A1 | 6/2004 | Aiello et al. |
| 2004/0153418 | A1 | 8/2004 | Hanweck |
| 2004/0250124 | A1 | 12/2004 | Chesla et al. |
| 2005/0125295 | A1 | 6/2005 | Tidwell et al. |
| 2005/0157662 | A1 | 7/2005 | Bingham et al. |
| 2005/0229256 | A2 | 10/2005 | Banzhof |
| 2005/0262556 | A1 | 11/2005 | Waisman et al. |
| 2005/0275638 | A1 | 12/2005 | Kolmykov-Zotov et al. |
| 2006/0021049 | A1 | 1/2006 | Cook |
| 2006/0031928 | A1 | 2/2006 | Conley et al. |
| 2006/0069912 | A1 | 3/2006 | Zheng et al. |
| 2006/0156407 | A1 | 7/2006 | Cummins |
| 2006/0179003 | A1 | 8/2006 | Steele et al. |
| 2006/0212931 | A1 | 9/2006 | Shull et al. |
| 2006/0218637 | A1 | 9/2006 | Thomas et al. |
| 2006/0265324 | A1 | 11/2006 | Leclerc et al. |
| 2006/0265747 | A1 | 11/2006 | Judge |
| 2006/0265751 | A1 | 11/2006 | Cosquer et al. |
| 2007/0067846 | A1 | 3/2007 | McFarlane et al. |
| 2007/0143851 | A1* | 6/2007 | Nicodemus ............. G06F 21/55<br>726/25 |
| 2007/0294766 | A1 | 12/2007 | Mir et al. |
| 2008/0005555 | A1 | 1/2008 | Lotem et al. |
| 2008/0082380 | A1 | 4/2008 | Stephenson |
| 2008/0104407 | A1 | 5/2008 | Horne et al. |
| 2008/0201580 | A1 | 8/2008 | Savitzky et al. |
| 2008/0222706 | A1 | 9/2008 | Renaud et al. |
| 2008/0229422 | A1 | 9/2008 | Hudis et al. |
| 2009/0103442 | A1 | 4/2009 | Douville |
| 2009/0228701 | A1 | 9/2009 | Lin |
| 2009/0292743 | A1 | 11/2009 | Bigus et al. |
| 2009/0328222 | A1 | 12/2009 | Helman et al. |
| 2010/0024017 | A1 | 1/2010 | Ashfield et al. |
| 2010/0077481 | A1 | 3/2010 | Polyakov et al. |
| 2010/0100963 | A1 | 4/2010 | Mahaffey |
| 2010/0179831 | A1 | 7/2010 | Brown et al. |
| 2010/0235915 | A1 | 9/2010 | Memon et al. |
| 2010/0262688 | A1 | 10/2010 | Hussain et al. |
| 2010/0330801 | A1 | 12/2010 | Rouh |
| 2011/0060910 | A1 | 3/2011 | Gornish et al. |
| 2011/0110633 | A1 | 5/2011 | Erlendsson |
| 2011/0202555 | A1 | 8/2011 | Cordover et al. |
| 2011/0219450 | A1 | 9/2011 | McDougal et al. |
| 2011/0288660 | A1 | 11/2011 | Wojsznis et al. |
| 2011/0295982 | A1 | 12/2011 | Misra |
| 2011/0296003 | A1 | 12/2011 | McCann et al. |
| 2012/0079592 | A1 | 3/2012 | Pandrangi |
| 2012/0084866 | A1 | 4/2012 | Stolfo |
| 2012/0110633 | A1 | 5/2012 | An et al. |
| 2012/0110674 | A1 | 5/2012 | Belani et al. |
| 2012/0169593 | A1 | 7/2012 | Mak et al. |
| 2012/0185419 | A1 | 7/2012 | Kuhn et al. |
| 2012/0198489 | A1 | 8/2012 | O'Connell et al. |
| 2012/0218305 | A1 | 8/2012 | Patterson et al. |
| 2012/0254129 | A1 | 10/2012 | Wheeler et al. |
| 2012/0266245 | A1 | 10/2012 | McDougal et al. |
| 2012/0284791 | A1 | 11/2012 | Miller et al. |
| 2012/0304244 | A1 | 11/2012 | Xie et al. |
| 2012/0323829 | A1 | 12/2012 | Stokes et al. |
| 2012/0330801 | A1 | 12/2012 | McDougal et al. |
| 2013/0019306 | A1 | 1/2013 | Lagar-Cavilla et al. |
| 2013/0097709 | A1 | 4/2013 | Basavapatna et al. |
| 2013/0110876 | A1 | 5/2013 | Meijer et al. |
| 2013/0139268 | A1 | 5/2013 | An et al. |
| 2013/0239217 | A1 | 9/2013 | Kindler et al. |
| 2013/0254833 | A1 | 9/2013 | Nicodemus et al. |
| 2013/0254885 | A1 | 9/2013 | Devost |
| 2013/0275416 | A1 | 10/2013 | Thomson et al. |
| 2014/0013451 | A1 | 1/2014 | Kulka et al. |
| 2014/0053265 | A1 | 2/2014 | Crowley |
| 2014/0059683 | A1 | 2/2014 | Ashley |
| 2014/0123279 | A1 | 5/2014 | Bishop et al. |
| 2014/0143009 | A1 | 5/2014 | Brice et al. |
| 2014/0173712 | A1* | 6/2014 | Ferdinand ............... H04L 63/02<br>726/11 |
| 2014/0173738 | A1 | 6/2014 | Condry et al. |
| 2014/0188895 | A1 | 7/2014 | Wang et al. |
| 2014/0201345 | A1 | 7/2014 | Abuelsaad et al. |
| 2014/0229422 | A1 | 8/2014 | Jain et al. |
| 2014/0279684 | A1 | 9/2014 | Liao et al. |
| 2014/0283107 | A1 | 9/2014 | Walton et al. |
| 2014/0366132 | A1 | 12/2014 | Stiansen et al. |
| 2015/0039565 | A1 | 2/2015 | Lucas |
| 2015/0089568 | A1 | 3/2015 | Sprague et al. |
| 2015/0128274 | A1 | 5/2015 | Giokas |
| 2015/0188715 | A1 | 7/2015 | Castellucci et al. |
| 2015/0229664 | A1 | 8/2015 | Hawthorn et al. |
| 2015/0235152 | A1 | 8/2015 | Eldardiry et al. |
| 2015/0248563 | A1 | 9/2015 | Alfarano et al. |
| 2015/0261847 | A1 | 9/2015 | Ducott et al. |
| 2015/0326601 | A1 | 11/2015 | Grondin et al. |
| 2016/0004864 | A1 | 1/2016 | Falk et al. |
| 2016/0028759 | A1 | 1/2016 | Visbal |
| 2016/0050224 | A1 | 2/2016 | Ricafort et al. |
| 2016/0191532 | A1 | 6/2016 | Seiver et al. |
| 2017/0099311 | A1 | 4/2017 | Kesin et al. |

(56) References Cited

U.S. PATENT DOCUMENTS

| | | | |
|---|---|---|---|
| 2017/0111381 | A1 | 4/2017 | Jones et al. |
| 2017/0195354 | A1 | 7/2017 | Kesin et al. |

FOREIGN PATENT DOCUMENTS

| | | |
|---|---|---|
| EP | 1589716 | 10/2005 |
| EP | 1962222 | 8/2008 |
| EP | 2284769 | 2/2011 |
| EP | 2892197 | 7/2015 |
| EP | 2897051 | 7/2015 |
| EP | 2963578 | 1/2016 |
| EP | 2985974 | 2/2016 |
| EP | 3110104 | 12/2016 |
| EP | 3133522 | 2/2017 |
| NL | 2011642 | 8/2015 |
| WO | WO 2005/010685 | 2/2005 |

OTHER PUBLICATIONS

Notice of Allowance for U.S. Appl. No. 14/982,699 dated Oct. 7, 2016.

Official Communication for U.S. Appl. No. 14/982,699 dated Aug. 26, 2016.

Official Communication for U.S. Appl. No. 15/207,343 dated Nov. 23, 2016.

Official Communication for U.S. Appl. No. 14/923,712 dated Jun. 17, 2016.

Notice of Allowance for U.S. Appl. No. 14/823,935 dated Apr. 25, 2016.

Notice of Allowance for U.S. Appl. No. 14/970,317 dated May 26, 2016.

Official Communication for U.S. Appl. No. 14/731,312 dated Apr. 14, 2016.

Official Communication for U.S. Appl. No. 14/816,748 dated May 24, 2016.

Official Communication for U.S. Appl. No. 15/071,064 dated Jun. 16, 2016.

Baker et al., "The Development of a Common Enumeration of Vulnerabilities and Exposures," Presented at the Second International Workshop on Recent Advances in Intrusion Detection, Sep. 7-9, 1999, pp. 35.

Bhuyan et al., "Network Anomaly Detection: Methods, Systems and Tools" First Quarter 2014, IEEE, 34 pages.

Crosby et al., "Efficient Data Structures for Tamper-Evident Logging," Department of Computer Science, Rice University, 2009, pp. 17.

FireEye—Products and Solutions Overview, http://fireeye.com/products-and-solutions Printed Jun. 30, 2014 in 3 pages.

FireEye, http://www.fireeye.com/ Printed Jun. 30, 2014 in 2 pages.

Glaab et al., "EnrichNet: Network-Based Gene Set Enrichment Analysis," Bioinformatics 28.18 (2012): pp. i451-i457.

Huang et al., "Systematic and Integrative Analysis of Large Gene Lists Using DAVID Bioinformatics Resources," Nature Protocols, 4.1, 2008, 44-57.

Hur et al., "SciMiner: web-based literature mining tool for target identification and functional enrichment analysis," Bioinformatics 25.6 (2009): pp. 838-840.

Lee et al., "A Data Mining and CIDF Based Approach for Detecting Novel and Distributed Intrusions," Lecture Notes in Computer Science, vol. 1907 Nov. 11, 2000, pp. 49-65.

Ma et al., "A New Approach to Secure Logging," ACM Transactions on Storage, vol. 5, No. 1, Article 2, Published Mar. 2009, 21 pages.

Schneier et al., "Automatic Event Stream Notarization Using Digital Signatures," Security Protocols, International Workshop Apr. 1996 Proceedings, Springer-Veriag, 1997, pp. 155-169, https://schneier.com/paper-event-stream.pdf.

Schneier et al., "Cryptographic Support for Secure Logs on Untrusted Machines," The Seventh USENIX Security Symposium Proceedings, USENIX Press, Jan. 1998, pp. 53-62, https://www.schneier.com/paper-secure-logs.pdf.

VirusTotal—About, http://www.virustotal.com/en/about/ Printed Jun. 30, 2014 in 8 pages.

Waters et al., "Building an Encrypted and Searchable Audit Log," Published Jan. 9, 2004, 11 pages, http://www.parc.com/content/attachments/building_encrypted_searchable_5059_parc.pdf.

Zheng et al., "GOEAST: a web-based software toolkit for Gene Ontology enrichment analysis," Nucleic acids research 36.suppl 2 (2008): pp. W385-W363.

Notice of Allowance for U.S. Appl. No. 14/033,076 dated Mar. 11, 2016.

Notice of Allowance for U.S. Appl. No. 14/223,918 dated Jan. 6, 2016.

Notice of Allowance for U.S. Appl. No. 14/280,490 dated Nov. 26, 2014.

Notice of Allowance for U.S. Appl. No. 14/473,860 dated Feb. 27, 2015.

Notice of Allowance for U.S. Appl. No. 14/473,860 dated Jan. 5, 2015.

Notice of Allowance for U.S. Appl. No. 14/479,863 dated Mar. 31, 2015.

Official Communication for European Patent Application No. 14199180.2 dated Jun. 22, 2015.

Official Communication for European Patent Application No. 14199180.2 dated Aug. 31, 2015.

Official Communication for European Patent Application No. 15175106.2 dated Nov. 5, 2015.

Official Communication for European Patent Application No. 15180985.2 dated Jan. 15, 2016.

Official Communication for U.S. Appl. No. 14/033,076 dated Aug. 13, 2015.

Official Communication for U.S. Appl. No. 14/033,076 dated Nov. 6, 2015.

Official Communication for U.S. Appl. No. 14/223,918 dated Jun. 8, 2015.

Official Communication for U.S. Appl. No. 14/280,490 dated Jul. 24, 2014.

Official Communication for U.S. Appl. No. 14/473,860 dated Nov. 4, 2014.

Official Communication for U.S. Appl. No. 14/479,863 dated Dec. 26, 2014.

Official Communication for U.S. Appl. No. 14/490,612 dated Aug. 18, 2015.

Official Communication for U.S. Appl. No. 14/490,612 dated Jan. 27, 2015.

Official Communication for U.S. Appl. No. 14/490,612 dated Mar. 31, 2015.

Official Communication for U.S. Appl. No. 14/816,748 dated Apr. 1, 2016.

Official Communication for U.S. Appl. No. 14/823,935 dated Dec. 4, 2015.

Official Communication for U.S. Appl. No. 14/923,712 dated Feb. 12, 2016.

Official Communication for U.S. Appl. No. 14/970,317 dated Mar. 21, 2016.

Official Communication for U.S. Appl. No. 14/982,699 dated Mar. 25, 2016.

Official Communication for European Patent Application No. 15180985.2 dated Mar. 30, 2017.

Official Communication for European Patent Application No. 16176273.7 dated Oct. 21, 2016.

Official Communication for European Patent Application No. 16184823.9 dated Nov. 24, 2016.

Official Communication for U.S. Appl. No. 15/395,483 dated Jul. 6, 2017.

Official Communication for U.S. Appl. No. 15/462,540 dated Jul. 5, 2017.

Official Communication for European Patent Application No. 17155145.0 dated Aug. 31, 2017.

(56) References Cited

OTHER PUBLICATIONS

Official Communication for U.S. Appl. No. 15/207,343 dated Sep. 27, 2017.

* cited by examiner

POSSIBLE TUNNELING CASE DETECTED – DAY 1

| Employee | Division | Person of Interest? | Based In | Tunneling to | Score |
|---|---|---|---|---|---|
| John Doe #1 | Enterprise Infrastructure | No | US | Russia | 2 |
| John Doe #2 | Global Capital Markets | No | UK | Russia | 1 |
| John Doe #3 | Institutional Securities Group | Yes - Acquisition | Russia | China | 5 |

POSSIBLE TUNNELING CASE DETECTED – DAY 1

| Employee | Division | Person of Interest? | Based In | Tunneling to | Score |
|---|---|---|---|---|---|
| John Doe #1 | Enterprise Infrastructure | No | US | Russia | 2 |
| John Doe #2 | Global Capital Markets | No | UK | Russia | 1 |
| John Doe #3 | Institutional Securities Group | Yes - Acquisition | Russia | China | 5 |

Mark as False Positive — 370

UNWANTED TUNNELING ALERT SYSTEM

CROSS-REFERENCE TO RELATED APPLICATIONS

This application is a continuation of U.S. patent application Ser. No. 14/823,935, entitled "UNWANTED TUNNELING ALERT SYSTEM" and filed on Aug. 11, 2015, which claims priority under 35 U.S.C. § 119(e) to U.S. Provisional Application No. 62/036,999, entitled "UNWANTED TUNNELING ALERT SYSTEM" and filed on Aug. 13, 2014, both of which are hereby incorporated by reference in their entireties.

TECHNICAL FIELD

The present disclosure relates to systems and techniques for detecting and handling malicious network tunneling.

BACKGROUND

A user may operate a computing device that resides within a first private network and that has access to a public network. For example, the computing device may reside at the user's residence and connect to the user's router and/or modem to access the Internet. Using the computing device, the user may wish to access a second computing device or server that resides within a second private network via the public network. For example, the second computing device or server may reside in an enterprise network and connect to the enterprise's router or firewall to access the Internet. However, the enterprise may restrict access to devices that operate within its network. For example, only devices that are directly connected to the enterprise network may access devices that reside within the enterprise network.

To access the enterprise network, the user may use a virtual private network (VPN) connection. The VPN connection may enable the user's computing device to send and receive data with devices on the enterprise network as if the user's computing device was directly connected to the enterprise network. Furthermore, the VPN connection may provide an encrypted connection to keep data secure and maintain the integrity of the enterprise network.

SUMMARY

The systems, methods, and devices described herein each have several aspects, no single one of which is solely responsible for its desirable attributes. Without limiting the scope of this disclosure, several non-limiting features will now be discussed briefly.

Disclosed herein are various systems and methods for detecting malicious network tunneling. For example, the various systems described herein may access VPN logs from a VPN server and outbound data connection logs (e.g., proxy logs) from a proxy server. The VPN logs may list the client IP addresses of devices that have established a VPN connection with the enterprise network through the VPN server. The outbound data connection logs may list the client IP addresses of devices associated with the enterprise network that have requested a connection to an external network (e.g., devices associated with the enterprise network that are the source of outbound data traffic) and may list the destination remote IP addresses specified by the request. The various systems described herein may parse the VPN logs and the outbound data connection logs to identify IP addresses that are present as client IPs in VPN logs and as remote IPs in outbound data connection logs. If an IP address is present as both a VPN client IP address and as an outbound data connection remote IP address, the various systems described herein may retrieve user data and traffic data associated with the client and remote IP addresses specified in both logs. For example, user data may include a user identification, employment title or position, access rights of the user, location information of the user (e.g., schedule information that identifies travel plans of the user) and/or other information associated with the user. Traffic data may include how many proxy connections are associated with a client IP address and how much data is received or transmitted via those connections, for example.

The various systems described herein may generate a risk score based on the retrieved user data and the retrieved traffic data. The risk score may be an indication of a likelihood that malicious network tunneling is occurring from a user accessing the network through a VPN (or other similar) connection. The risk score may also be an indication of the potential impact, damage, or business implications of the malicious network tunneling. If the risk score exceeds a threshold, the various systems described herein may generate an alert that can be displayed in a graphical user interface (GUI).

One aspect of the disclosure provides a computing system configured to detect malicious network tunneling. The computing system comprises a computer processor. The computing system further comprises a computer readable storage medium storing program instructions configured for execution by the computer processor in order to cause the computing system to: access a virtual private network (VPN) log including a listing of one or more first client IP addresses assigned to a corresponding one or more remote users granted access to the network via VPN connections; access a data connection log including a listing of one or more second client IP addresses that requested outbound data connections from the network and a listing of one or more remote IP addresses identified by the outbound data connections; identify a first IP address included in the VPN log as a first client IP address and in the data connection log as a remote IP address; determine user data associated with the first IP address, the user data including one or more of a user identity, a user role, a user geographic location, or a user access level; determine traffic data associated with the first IP address, the traffic data including information regarding any connections from the network initiated by the first IP address; generate a risk score based on at least the determined user data and the determined traffic data, the risk score at least partly indicative of a likelihood that the traffic data includes one or more malicious tunneling connections; and generate an alert if the risk score exceeds a threshold value.

The computing system of the preceding paragraph can have any sub-combination of the following features: where the risk score is based on at least one of a mismatch between a geographic location of a computing device associated with the first IP address and a geographic location of the network, employment title of a user associated with the first IP address, access rights of the user associated with the first IP address, a time between when a VPN connection associated with the first IP address is established and when a tunneled connection associated with the first IP address is established, an amount of data transferred using the tunneled connection, or a type of uniform resource locator associated with the tunneled connection; where, in connection with a determination that the data connection log indicates that a tunneled connection is established over a first port, the generated risk score is lower than if the tunneled connection is established over a second port; where a VPN connection and a tunneled connection between a computing device associated with the first IP address and the network are encrypted; where the computer readable storage medium further stores program instructions that cause the computing system to process feedback received regarding the generated alert, wherein the feedback affects generation of a second risk score in connection with an identification of a second IP address listed in both the VPN log as a first client IP address and in the data connection log as a remote IP address having one or more characteristics in a corresponding second user data or second traffic data in common with the user data or the traffic data associated with the first IP address; where the alert comprises information that at least partly indicates the user data or the traffic data that contributed to the risk score exceeding the threshold value; and where the computer readable storage medium further stores program instructions that cause the computing system to generate a user interface comprising the alert for display.

Another aspect of the disclosure provides a computer-implemented method of detecting malicious network tunneling to external computing devices. The computer-implemented method comprises as implemented by one or more computer systems comprising computer hardware and memory, the one or more computer systems configured with specific executable instructions, accessing a first log including a listing of one or more first source addresses assigned to a corresponding one or more remote users granted access to a network via VPN connections; accessing a second log including a listing of one or more second source addresses that requested outbound data connections from the network and a listing of one or more destination addresses identified by the outbound data connections; identifying a first address included in both the first log as a first source address and in the second log as a destination address; determining user data associated with the first address, the user data including one or more of a user identity, a user role, a user geographic location, or a user access level; determining traffic data associated with the first address, the traffic data including information regarding any connections from the network initiated by the first address; generating a risk score based on at least the determined user data and the determined traffic data; and generating an alert if the risk score exceeds a threshold value.

The computer-implemented method of the preceding paragraph can have any sub-combination of the following features: where the risk score is based on at least one of a mismatch between a geographic location of a computing device associated with the first address and a geographic location of the network, employment title of a user associated with the first address, access rights of the user associated with the first address, a time between when a VPN connection associated with the first address is established and when a tunneled connection associated with the first address is established, an amount of data transferred using the tunneled connection, or a type of uniform resource locator associated with the tunneled connection; where, in connection with a determination that the second log indicates that a tunneled connection is established over a first port, the generated risk score is lower than if the tunneled connection is established over a second port; where a VPN connection and a tunneled connection between a computing device associated with the first address and the first network are encrypted; where the computer-implemented method further comprises receiving feedback regarding the generated alert, and in connection with an identification of a second address listed in both the first log as a first source address and in the second log as a destination address, generating a second risk score based on the received feedback; where the alert comprises information that at least partly indicates the user data or the traffic data that contributed to the risk score exceeding the threshold value; and where the computer-implemented method further comprises generating a graphical representation of the alert for display in a user interface.

Another aspect of the disclosure provides a non-transitory computer-readable medium comprising one or more program instructions recorded thereon, the instructions configured for execution by a computing system comprising one or more processors in order to cause the computing system to: access a first log including a listing of one or more first source addresses assigned to a corresponding plurality of remote users granted access to a network via VPN connections; access a second log including a listing of one or more second source addresses that requested outbound data connection from the network and a listing of one or more destination addresses identified by the outbound data connections; identify a first address included in both the first log as a first source address and in the second log as a destination address; determine user data associated with the first address, the user data including one or more of a user identity, a user role, a user geographic location, or a user access level; determine traffic data associated with the first address, the traffic data including information regarding any connections from the network initiated by the first address; generate a risk score based on at least the determined user data and the determined traffic data; and generate an alert if the risk score exceeds a threshold value.

The computer-implemented method of the preceding paragraph can have any sub-combination of the following features: where the risk score is based on at least one of a mismatch between a geographic location of a computing device associated with the first address and a geographic location of the network, employment title of a user associated with the first address, access rights of the user associated with the first address, a time between when a VPN connection associated with the first address is established and when a tunneled connection associated with the first address is established, an amount of data transferred using the tunneled connection, or a type of uniform resource locator associated with the tunneled connection; where, in connection with a determination that the second log indicates that a tunneled connection is established over a first port, the generated risk score is lower than if the tunneled connection is established over a second port; wherein the instructions are further configured to cause the computing system to: process feedback received regarding the generated alert, and in connection with an identification of a second address listed in both the first log as a first source address and in the second log as a destination address, generate a second risk score based on the processed feedback; where the alert comprises information that at least partly indicates the user data or the traffic data that contributed to the risk score exceeding the threshold value; and where the instructions are further configured to cause the computing system to generate a graphical representation of the alert for display in a user interface.

DETAILED DESCRIPTION OF SPECIFIC EMBODIMENTS

Overview

Figure 1:
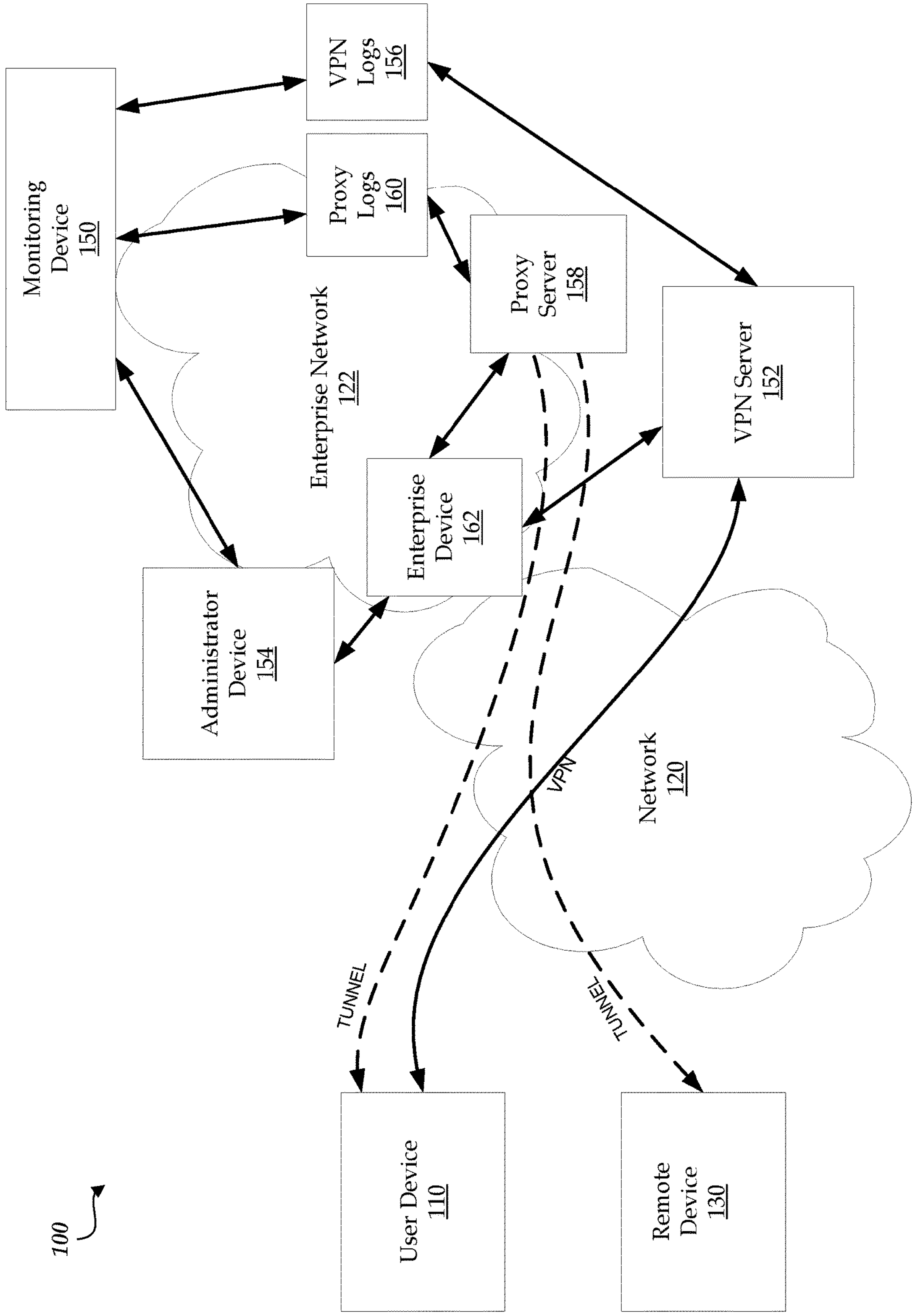
FIG. 1 illustrates a block diagram of a system for detecting malicious network tunneling according to one embodiment.

As described above, a user can use a computing device connected to a residential network to access an enterprise network via a virtual private network (VPN) connection. After establishing a VPN connection from a user computing device (e.g., a residential computing device) to an enterprise computing device (e.g., a computing device that is a part of the enterprise network, a VPN server, etc.), the user can transfer data between both devices using the VPN connection. Furthermore, a user may initiate an additional transmission path back to the user computing device (or some other computing device) in order to transfer data specifically to that computing device. For example, once connected to the VPN Server, the enterprise computing device accessed by the user can request a proxy communication to the IP address of the user computing device as a destination. One example of a proxy communication is a secure transfer of data (e.g., using Secure Shell (SSH) tunneling over Hypertext Transfer Protocol (HTTP)), which can reduce the risk that a sniffer or other network monitoring control can determine what data has been transmitted to the user computing device. Such transmissions of data from the enterprise network to external devices may be advantageous in some scenarios, such as to allow an employee to transfer sensitive data that is needed remotely via a secure channel. However, transmissions of data in this manner may also be used maliciously, such as by an employee transmitting sensitive data to his home computer via a SSH tunnel over HTTP so that his employer cannot detect transmission of that sensitive data (which would be more easily detectable if the employee used simply the VPN connection to transmit the data), and misusing that sensitive data. Furthermore, a user can tunnel to an external device to bypass network restrictions (e.g., to watch videos, visit banned websites, etc.). As another example, the user computing device and/or an enterprise computing device may be compromised (e.g., the user's VPN credentials may be stolen) such that an automated program or malicious user can hide the exfiltration of data or create a persistent re-entry point into the enterprise network.

Accordingly, disclosed herein are various systems and methods for detecting malicious network tunneling. For example, the various systems described herein may access VPN logs from a VPN server and outbound data connection logs (e.g., proxy logs) from a proxy server. The VPN logs may list the client IP addresses of devices that have established a VPN connection with the enterprise network through the VPN server. The outbound data connection logs may list the client IP addresses of devices associated with the enterprise network that have requested a connection to an external network (e.g., devices associated with the enterprise network that are the source of outbound data traffic) and may list the destination remote IP addresses specified by the request. The various systems described herein may parse the VPN logs and the outbound data connection logs to identify IP addresses that are present as client IPs in VPN logs and as remote IPs in outbound data connection logs. If an IP address is present as both a VPN client IP address and as an outbound data connection remote IP address, the various systems described herein may retrieve user data and traffic data associated with the client and remote IP addresses specified in both logs. For example, user data may include a user identification, employment title or position, access rights of the user, location information of the user (e.g., schedule information that identifies travel plans of the user), and/or other information associated with the user. Traffic data may include how many proxy connections are associated with the client IP address and how much data is received or transmitted via those connections, for example.

The various systems described herein may generate a risk score based on the retrieved user data and the retrieved traffic data. The risk score may be an indication of a likelihood that malicious network tunneling is occurring from a user accessing the network through a VPN (or other similar) connection. The risk score may also be an indication of the potential impact, damage, or business implications of the malicious network tunneling. If the risk score exceeds a threshold, the various systems described herein may terminate the malicious tunneling connections and/or generate an alert that can be displayed in a graphical user interface (GUI). While the various systems are described herein with respect to malicious network tunneling, this is not meant to be limiting. The various systems described herein may be implemented to detect and handle unauthorized, erroneous, and/or otherwise unwanted network tunneling in the same manner as described with respect to malicious network tunneling.

Malicious Network Tunneling Detection System Overview

FIG. 1 illustrates a block diagram of one embodiment of a system 100 for detecting malicious network tunneling. The system 100 comprises a user device 110, a remote device 130, a monitoring device 150, a VPN server 152, an administrator device 154, VPN logs data structure 156, a proxy server 158, proxy logs data structure 160, enterprise device 162, a network 120, and an enterprise network 122.

In the embodiment illustrated in FIG. 1, the user device 110 may be associated with a first private network. For example, the user device 110 can be associated with a residential wired or wireless network. The user device 110 may have access to a public network (e.g., the network 120, which may include the Internet). The user device 110 accesses the VPN server 152 via a VPN connection (or other remote access connections in other embodiments, such as the VNC or similar screen sharing applications) to the VPN server 152 to access the resources on the enterprise network 122 (e.g., the enterprise device 162). The VPN server 152 determines a client IP address of the user device 110 and stores this client IP address in the VPN logs data structure 156. As the user device 110 accesses enterprise network 122 resources and/or external resources (e.g., websites or external databases), the proxy server 158 records logs of information that is accessed by each client IP address, such as in the proxy logs data structure 160.

The monitoring device 150 may identify client IP addresses used to access internal and/or external resources and, additionally, may determine whether the client IP address is also a remote IP address (e.g., an IP address identified as a destination IP address in a request to access an external network). For example, the monitoring device 150 may access the VPN logs data structure 156 and the proxy logs data structure 160. The VPN logs data structure 156 may be any data store that includes VPN logs and the proxy logs data structure 160 may be any data store that includes proxy logs. The VPN logs in the VPN logs data structure 156 may indicate the IP addresses of devices (e.g., client IP addresses) that have established a connection with the enterprise network 122 via the VPN server 152 (e.g., devices that have established a VPN connection with the enterprise network 122). The proxy logs in the proxy logs data structure 160 may indicate the IP addresses of devices that have initiated or are engaging in network communications with external devices (e.g., client IP addresses of devices that have established outbound connections) and the IP addresses of the external devices to which an external connection is requested (e.g., remote IP addresses). The monitoring device 150 may review the VPN logs and the proxy logs to identify IP addresses that are found in both logs (e.g., identify IP addresses that are client IP addresses in the VPN logs and client IP addresses in the proxy logs, identify IP addresses that are client IP addresses in the VPN logs and remote IP addresses in the proxy logs, etc.). If an IP address associated with the user device 110 is found in both logs (e.g., the IP address of the user device 110 is a client IP address in the VPN logs and a client IP address in the proxy logs), this may indicate that the user device 110 has established a VPN connection via the VPN server 152 and a proxy connection via the proxy server 158. As used herein, a proxy connection may include any communication that originates from the user device 110 while the user device 110 has established a VPN connection. For example, a proxy connection can include a tunneled connection (e.g., a secure connection, such as an SSH tunnel connection), other secure network connections (e.g., secure web traffic), a non-secure connection (e.g., non-secure web traffic), and/or the like.

Once an IP address that is present in both logs is identified, the monitoring device 150 may perform an analysis of the communications and of the user associated with the IP address to determine whether such activities are low risk (e.g., directly related to the user's job) or high risk (e.g., likely malicious behavior by the user). For example, the monitoring device 150 may identify all proxy traffic associated with the client IP address (e.g., traffic data originating from the client IP address) and perform an analysis of such traffic. The monitoring device 150 may also determine a user associated with the client IP address by first determining a computing device associated with the client IP address. The monitoring device 150 may determine a computing device associated with the client IP address by parsing dynamic host configuration protocol (DHCP) events (e.g., events that are logged when the VPN server 152 or another DHCP server assigns IP addresses to the user device 110) and/or by correlating IP addresses between the client IP address and the IP address of the computing device. Based on the determined computing device, the monitoring device 150 can identify a system account that is listed as being the owner of the determined computing device. The system account may be linked with the relevant user and the user's information may be retrieved. As disclosed herein, various criteria based on the proxy traffic and the user's information may be analyzed to determine a risk score associated with the communications from the client IP address, which may result in the termination of the malicious tunneling connections and/or generation of one or more alerts that are presented in a GUI interface. The monitoring device 150 may perform other techniques to gather additional data related to the client IP address using a clustering process, such as those disclosed in U.S. Pat. No. 8,788,405, which is hereby incorporated by reference in its entirety. For example, the client IP address may be designated as a seed, and various traffic and/or user information usable to generate one or more scores for the client IP address may be identified via a clustering process.

The remote device 130 may be associated with a second private network and may also have access to the public network 120. The monitoring device 150, the VPN server 152, the administrator device 154, the VPN logs data structure 156, the proxy server 158, the proxy logs data structure 160, and the enterprise device 162 may each be associated with a third private network, such as the enterprise network 122. The VPN server 152 and the proxy server 158 may also, or alternatively, have access to the public network 120. In some embodiments, each such physical computing device may be implemented as a computer system including some or all of the components illustrated in the example computing system 400 of FIG. 4. For example, the user device 110, the remote device 130, the monitoring device 150, the VPN server 152, the administrator device 154, the VPN logs data structure 156, the proxy server 158, the proxy logs data structure 160, and/or the enterprise device 162 may be implemented in a computer system as a set of program instructions recorded on a machine-readable storage medium.

As described above, the user device 110 can access the VPN server 152 via a VPN connection to the VPN server 152 and the VPN server 152 stores a client IP address of the user device 110 in the VPN logs data structure 156. Once the VPN connection is established, the user device 110 may be in communication with the enterprise device 162, which may be any computing device associated with the enterprise network 122 (e.g., a desktop computer or a laptop computer connected to the enterprise network 122). The enterprise device 162 may be instructed to establish a tunneled connection with the user device 110 or the remote device 130 via the network 120. In alternative embodiments, once the VPN connection is established, the user device 110 may be in communication with VPN server 152 and the VPN server 152 may provide the user device 110 with the capability to establish a tunneled connection back to the user device 110 or the remote device 130 via the network 120. For example, the tunneled connection can be used to transfer enterprise network 122 resources to external devices (e.g., the user device 110 or the remote device 130) without detection (e.g., packet sniffers or other such network monitoring devices may not be able to decipher the contents of the tunneled communications). The tunneled connection may be established at the direction of communications received by the enterprise device 162 from the user device 110 using the client IP address, for example. Alternatively, the tunneled connection may be established at the direction of instructions generated by a device associated with the enterprise network 122 (not shown), such as at the request of a user of the user device 110. The VPN connection and/or the tunneled connection may be encrypted. For example, the user device 110 may establish a tunneled connection to make working at home more convenient. As another example, the user device 110 may establish a tunneled connection to the remote device 130 to allow for the exfiltration of data from the enterprise network 122.

In an embodiment, the monitoring device 150 is configured to monitor communications to and from the enterprise network 122. For example, the monitoring device 150 can be a firewall, router, packet analyzer, or any other device (or combination of devices) that can intercept and log traffic passing over or through a part of a network (e.g., traffic passing through a port on a computing device associated with the enterprise network 122, traffic passing through a hub, etc.). The monitoring device 150 may store the intercepted data in a data store (e.g., the proxy data logs data structure 160) for later analysis.

In a further embodiment, the monitoring device 150 is configured to analyze the intercepted data to identify communications associated with a client IP address, identify additional traffic data related to the client IP address (such as via a clustering process, for example), and generate a risk score. The risk score may be generated based on the intercepted data and other collected information. In some embodiments, the risk score may ultimately be used to determine whether an IT administrator should be alerted as to potentially malicious activity. In some embodiments, the monitoring device 150 may itself terminate the identified malicious tunneling connections or cause the VPN server 152 and/or the proxy server 158 to terminate the identified malicious tunneling connections. In some embodiments, both an alert is provided and the malicious tunneling connections are automatically terminated.

Example Risk Score Factors

For example, the risk score may be based on a mismatch between a geographic location of devices associated with the enterprise network 122 (e.g., a geographic location or address of a building where the user works) and a geographic location of the device to which a tunneled connection has been established (e.g., the user device 110 or the remote device 130). A mismatch in geographic locations (e.g., the devices are located in different countries) may indicate a likelihood that the tunneling is malicious is high, and thus may result in a higher risk score. In some embodiments, the user associated with the user device 110 may be traveling. The monitoring device 150 may use the user's travel data to remove false positives (e.g., proxy connections that are not tunneled connections, tunneled connections that have a low risk of being associated with malicious activity, etc.). For example, if the devices associated with the enterprise network 122 are in the United States, the user traveled to Russia, and the location of the device to which a tunneled connection has been established is Russia, a mismatch in geographic location may not affect the risk score.

The risk score may also be based on a geographic location of the device to which a tunneled connection has been established. For example, if the user device 110 or the remote device 130 is located in a geographic location that is considered suspect, such as China or Russia, the risk score may be higher than if the user device 110 or the remote device 130 is located in a geographic location that is not considered suspect, such as the United States. Again, in some embodiments, the monitoring device 150 may use travel data associated with the user to remove false positives. For example, if the user traveled to China, and the location of the device to which a tunneled connection has been established is China, a geographic location of the device to which a tunneled connection has been established may not affect the risk score.

The risk score may also be based on an employment title, position, role, responsibility, etc. of a user associated with the user device 110 and/or the VPN credentials used to establish the VPN connection. For example, if the employment title of the user indicates that the user has increased access to confidential documents or administrative access to devices associated with the enterprise network 122 (e.g., an IT administrator, an employee with a high level of clearance, etc.), then the risk score associated with detected tunneling by that user may be higher than if the employment title of the user indicates that the user has little access to confidential documents or administrative access to devices associated with the enterprise network 122 (e.g., an intern, a guest user, etc.).

The risk score may also be based on access rights of the user associated with the user device 110 and/or the VPN credentials used to establish the VPN connection. For example, a user with greater access rights has a greater opportunity to engage in harmful activities. Thus, the risk score may be higher for a first user if the first user has access to more confidential documents than a second user, even if the two users have the same employment title.

The risk score may also be based on a time between when the first connection is established (e.g., the VPN connection established by the VPN server 152) and when the second connection is established (e.g., the tunneled connection(s) established at the direction of the user device 110 using a client IP address and the proxy server 158). For example, if there is a short amount of time between the two connections (e.g., 30 seconds, 1 minute, 2 minutes, etc.), this may indicate that an automated program (e.g., a script, a bot, etc.) established the first and/or the second connection, possibly without the knowledge of the user of the user device 110. However, a long amount of time between the two connections (e.g., 12 hours, 1 day, etc.) may indicate that the user is engaging in less harmful activities (e.g., making working from home more convenient). Thus, the risk score may be higher if there is a short amount of time between the two connections.

The risk score may also be based on an amount of data transferred using the second connection or connections associated with a client IP address (e.g., the tunneled connection(s)). For example, if a large amount of outbound data (e.g., enterprise network 122 resources) is being transferred to the user device 110 or the remote device 130 (e.g., greater than 10 MB, greater than an average amount, etc.), then it may indicate that harmful activity is taking place. Thus, the risk score may be higher if there is a large amount of outbound data transferred to the user device 110 or the remote device 130. As another example, if a large amount of inbound data is being transferred from the user device 110 or the remote device 130 to be stored on the enterprise network 122 (e.g., greater than 10 MB, greater than an average amount, etc.), then it may indicate that harmful activity is not taking place (e.g., a benign, large file is being downloaded). Thus, the risk score may be lower if there is a large amount of outbound data transferred from the user device 110 or the remote device 130. The amount of data received or transmitted may indicate a total amount of traffic associated with a particular client IP address (e.g., multiple outbound connections to the home IP address) over a predetermined time period, such as 1 hour, 6 hours, 12 hours, 24 hours, 2 days, etc.

The risk score may also be based on a type of uniform resource locator (URL) associated with the device to which a proxy connection is established. For example, if a domain name server (DNS) does not recognize the URL associated with the user device 110 or the remote device 130, then this may indicate that the URL is associated with malicious activity. Thus, the risk score may be higher if the DNS cannot recognize the URL. As another example, if the URL is a file transfer protocol (FTP) address rather than a hypertext transfer protocol (HTTP) address, this may indicate malicious activity since FTP addresses are generally used to transfer files. Thus, the risk score may be higher if the URL is an FTP address rather than an HTTP address.

The risk score may also be based on an IP address that the device to which a proxy connection is established is attempting to connect to. For example, once the tunneled connection is established with the user device 110 and/or the remote device 130, the user device 110 or the remote device 130 may attempt to connect to an IP address. The monitoring device 150 can use third party validation sources (e.g., IPVOID, etc.) to determine whether the IP address is a known bad IP address or not. If the IP address is not a known bad IP address, then the risk score may be lower. If the IP address is a known bad IP address, then the risk score may be higher.

The risk score may also be based on a port used to transfer data over the proxy connection. For example, data that travels through some ports, such as port 80 or port 443, may appear to have a tunneled signature, but is just merely normal traffic from a network page, such as a website. If the data travels through such ports or ports with low numbers, the risk score may be lower, indicating a possible false positive. On the other hand, data that travels through ports with high numbers (e.g., greater than 1000) or uncommon numbers may be considered suspicious. Thus, in such cases, the risk score may be higher.

The monitoring device 150 may weight one or more of the factors described above in determining the risk score. The weights applied to the factors may depend on how much each factor affects the likelihood that malicious activity is taking place. For example, factors that more greatly affect the likelihood that malicious activity is taking place may be weighted more heavily than a mismatch in geographic locations factor.

In a further embodiment, the monitoring device 150 is configured to generate one or more alerts based on the risk score. For example, the monitoring device 150 may generate an alert if the risk score exceeds a threshold value (e.g., thereby indicating that harmful activity may be taking place). The monitoring device 150 may forward the alert to the administrator device 154 for display in an alert queue or may display the alert in an alert queue.

In some embodiments, the monitoring device 150 is also configured to automatically terminate connections between the enterprise network 122 and the user device 110 and/or the remote device 130 based on whether an alert is generated, content of the alert, and/or other score and/or alert attributes. For example, if a particular high risk alert is generated, then the monitoring device 150 may terminate the VPN connection of the user device 110 and/or the tunneled connection to the user device 110 or the remote device 130. The monitoring device 150 may also automatically restrict access to the resources of the enterprise network 122 and/or block communications from the user device 110, the remote device 130, and/or the user of the user devices.

Example Alert Reports

The administrator device 154 may generate a user interface to display the generated alerts. For example, the administrator device 154 may generate a user interface similar to the user interface 300 described below with respect to FIGS. 3A-3D. Via the administrator device 154, an IT administrator may view information related to the generated alert to investigate whether the harmful activity is taking place. If the IT administrator determines that harmful activity is not taking place, the IT administrator may input this information. The administrator device 154 may forward the information that the generated alert is not associated with harmful activity to the monitoring device 150 and the monitoring device 150 may use this information when generating risk scores in the future. For example, the monitoring device 150 may generate a lower risk score in the future if the factors otherwise have the same or similar values.

Via the administrator device 154, the IT administrator may also terminate VPN and/or tunneled connections. For example, if the IT administrator determines that the generated alert is associated with harmful activity, the IT administrator may terminate the VPN and/or proxy connection to prevent any further harmful activities. The administrator device 154 may also restrict access to the resources of the enterprise network 122 and/or block communications from the user device 110 and/or the remote device 130.

The monitoring device 150 may enhance reliability of the third private network and improve the usability of computing devices associated with the enterprise network 122 by reducing the likelihood that a compromised device can affect the usability or performance of other devices on the enterprise network 122. The monitoring device 150 may also reduce the processor load of the individual devices associated with the enterprise network 122 because the monitoring of communications can be offloaded to a central computing device (e.g., the monitoring device 150).

While the monitoring device 150 is described herein as generating the risk score and/or the alert, this is not meant to be limiting. Any device that is associated with the enterprise network 122 and/or any device that is in communications with the monitoring device 150 can generate the risk score and/or the alert. For example, the administrator device 154 may generate the risk score and/or the alert.

In an embodiment, the network 120 includes any communications network, such as the Internet. The network 120 may be a wired network, a wireless network, or a combination of the two. For example, network 120 may be a local area network (LAN) and/or a wireless area network (WAN). Similarly, the enterprise network 122 may be a wired network, a wireless network, or a combination of the two. The enterprise network 120 may be a LAN and/or a WAN and may allow access to the network 120.

Example Process Flow

Figure 2:
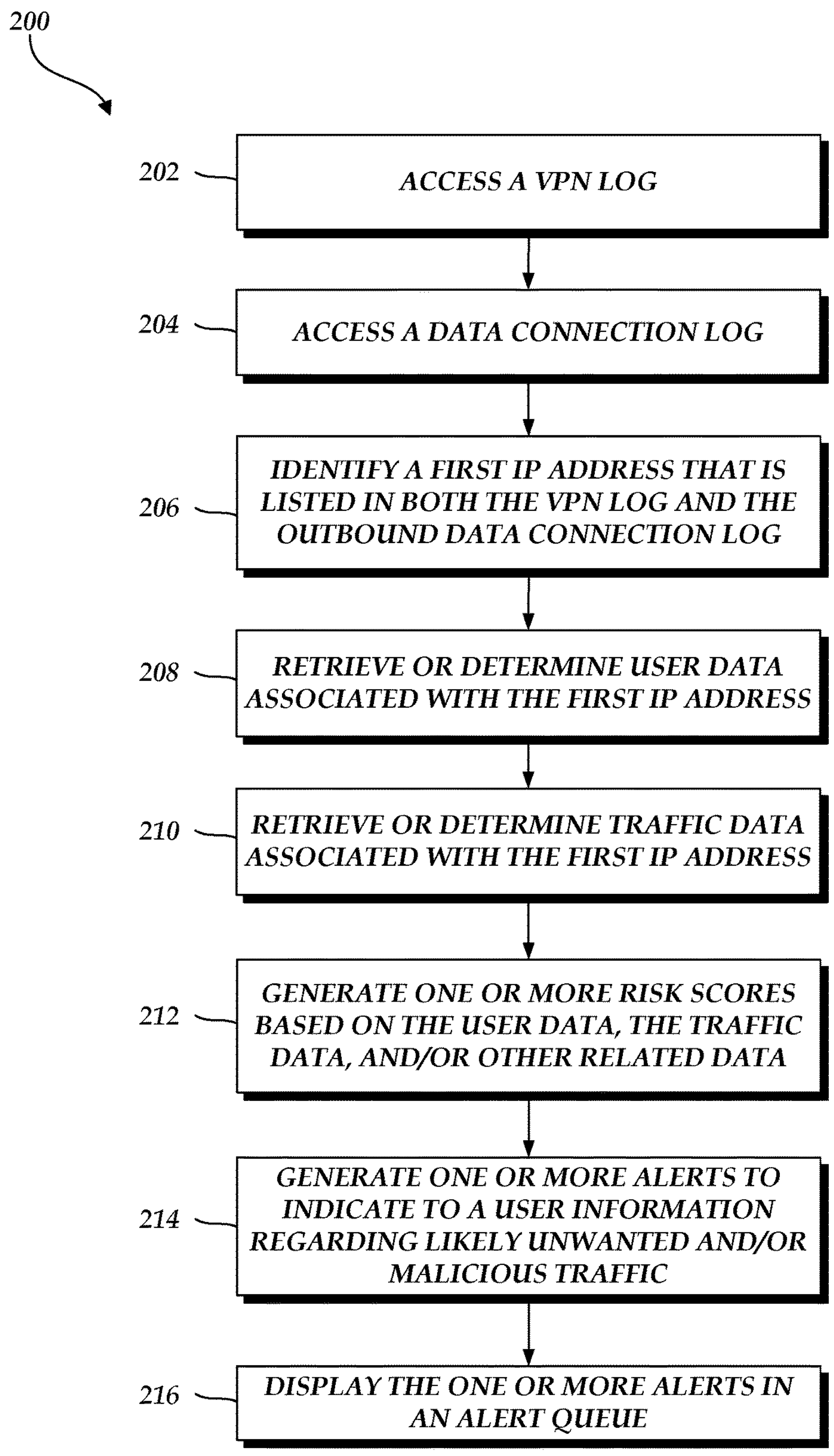
FIG. 2 is a flowchart depicting one embodiment of a method of detecting malicious network tunneling.

FIG. 2 is a flowchart 200 depicting an illustrative operation of detecting malicious network tunneling (or other proxy traffic in other embodiments). Depending on the embodiment, the method of FIG. 2 may be performed by various computing devices, such as by the monitoring device 150. Depending on the embodiment, the method of FIG. 2 may include fewer and/or additional blocks and the blocks may be performed in an order different than illustrated.

In block 202, a VPN log for an enterprise network (or other network) is accessed. In an embodiment, the VPN log lists client IP addresses that established remote VPN connections with the enterprise network.

In block 204, a data connection log for the enterprise network (or other network) is accessed. In an embodiment, the data connection log (e.g., proxy log) lists client IP addresses that have requested connections to devices external to the enterprise network and the IP addresses (e.g., remote IP addresses) of these external devices.

In block 206, the monitoring device identifies a first IP address that is listed in both the VPN log as a client IP address and in the data connection log as a remote IP address. If the first IP address is listed in both logs (e.g., as a client IP address in the VPN log and a remote IP address in the data connection log), this may indicate that a device associated with the first IP address has established a proxy connection (e.g., a tunneled connection back to the device via a proxy server of the enterprise network).

In block 208, user data associated with the first IP address is retrieved and/or determined. The user data may include one or more of a user identity, a user role, a user geographic location, or a user access level.

In block 210, traffic data associated with the first IP address is retrieved and/or determined. The traffic data may include information regarding any connections from the enterprise network initiated by the first IP address. In an embodiment, the first IP address is designated as a seed and additional traffic data associated with the first IP address, such as additional connections associated with the first IP address and quantity of data transmitted in those connections, may be obtained using a clustering process. For example, in a first phase of clustering the user associated with the first IP address may be identified, and then in a second phase of clustering, additional data regarding the user, such as a user role or data access rights, may be identified.

In block 212, one or more risk scores are generated based on at least the user data, the traffic data, and/or other related data. In an embodiment, a risk score is generated based on a weighting of one or more of the factors described above. The risk score may be indicative of a likelihood that the traffic data includes one or more malicious tunneling connections.

In block 214, one or more alerts may be generated to indicate to a user, such as a system administrator, information regarding likely unwanted and/or malicious traffic. In one embodiment, some alerts are provided only if a risk score exceeds a threshold value. In an embodiment, the alert includes information that at least partly indicates what caused the risk score to exceed the threshold value. FIGS. 3A-3D include further description and examples of how such alerts are generated and provided to a user.

In block 216, the one or more alerts are displayed in an alert queue. In an embodiment, an alert can provide information that allows an IT administrator to terminate a VPN connection and/or a tunneled connection if warranted.

Example Alert Queue

Figure 3A:
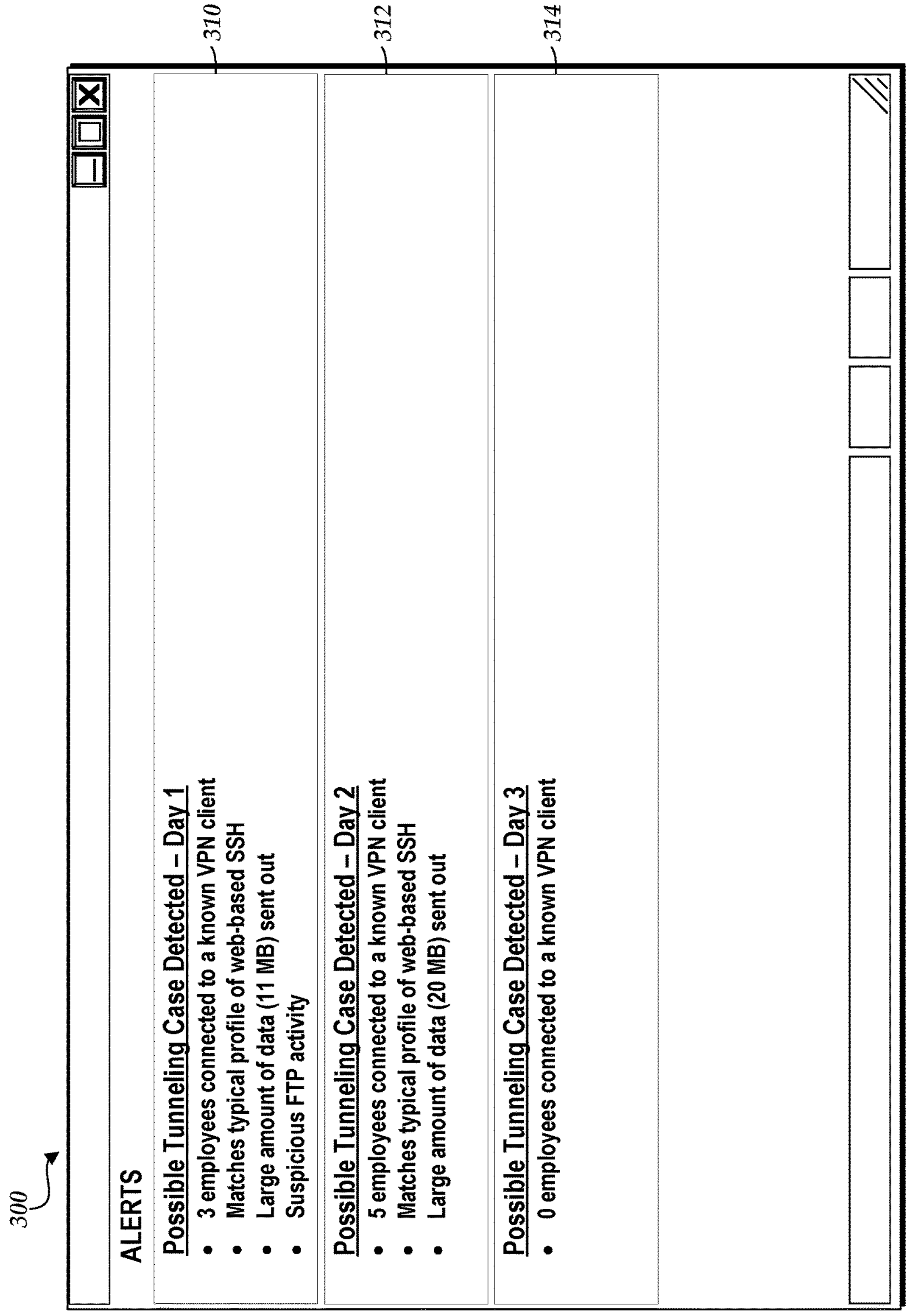
FIGS. 3A-3D illustrate example user interfaces displaying alerts generated when malicious network tunneling is detected.

FIGS. 3A-3D illustrate a user interface 300 displaying an alert queue. The alert queue may be displayed for the benefit of an IT administrator of the enterprise network. The interface 300 may be displayed by the monitoring device 150 and/or the administrator device 154. As illustrated in FIG. 3A, the interface 300 includes three alerts 310, 312, and 314. In some embodiments, the alerts 310, 312, and 314 are generated periodically. For example, the alerts 310, 312, and 314 may be generated each hour, each day, each week, each month, and/or the like. If an alert is generated periodically, the alert 310, 312, or 314 may include information on a plurality of devices that may be engaging in harmful activity. As illustrated in FIG. 3A, the alerts 310, 312, and 314 are generated each day. In other embodiments, the alerts 310, 312, and 314 are generated automatically when a risk score exceeds a threshold value.

The alerts 310, 312, and 314 may include a summary of information associated with the alert. For example, an alert 310, 312, or 314 may include a number of users that are connected to a known VPN client during the time period associated with the alert (e.g., a number of users that have established VPN connections with the VPN server 152), an indication of whether the characteristics of the traffic between the enterprise network 122 and another device matches or closely matches a typical profile of a tunneled connection, whether a large amount of outbound data was transmitted to the user device 110 and/or the remote device 130, whether there was any suspicious FTP activity, whether a country mismatch was detected, whether a person of interest was involved in any activities (e.g., a person that has a high clearance level, a person that is under investigation, etc.), and/or whether there is a suspected case of a VPN compromise, such as the stealing of credentials (e.g., a suspect case of a VPN compromise may occur if the VPN connection and the tunneled connection are established or requested within a short time, such as 30 seconds, of each other).

In some embodiments, the alert 310, 312, and 314 always displays the number of users that are connected to a known VPN client and only displays other information if the other information is true (e.g., only displays that the characteristics of the traffic between the monitored device 152 and another device match or closely match if that fact is true). Table 1 below indicates how such information can be selected for display:

TABLE 1

| Information Associated with an Alert | Display Rules |
|---|---|
| A number of users that are connected to a known VPN client during the time period associated with the alert | Display always |
| Characteristics of the traffic between the enterprise network 122 and another device matches or closely matches a typical tunneled connection profile | Display if true |
| A large amount of outbound data was transmitted to the user device 110 and/or the remote device 130 | Display if true |
| Suspicious FTP activity detected | Display if true |
| Country mismatch detected | Display if true |
| Person of interest involved | Display if true |
| Suspected case of a VPN compromise | Display if true |

For example, the alert 310 indicates that suspicious FTP activity was detected, whereas the alert 314 does not. Furthermore, the alert 314 indicates the number of users that are connected to a known VPN client, even though it is zero.

Figure 3B:
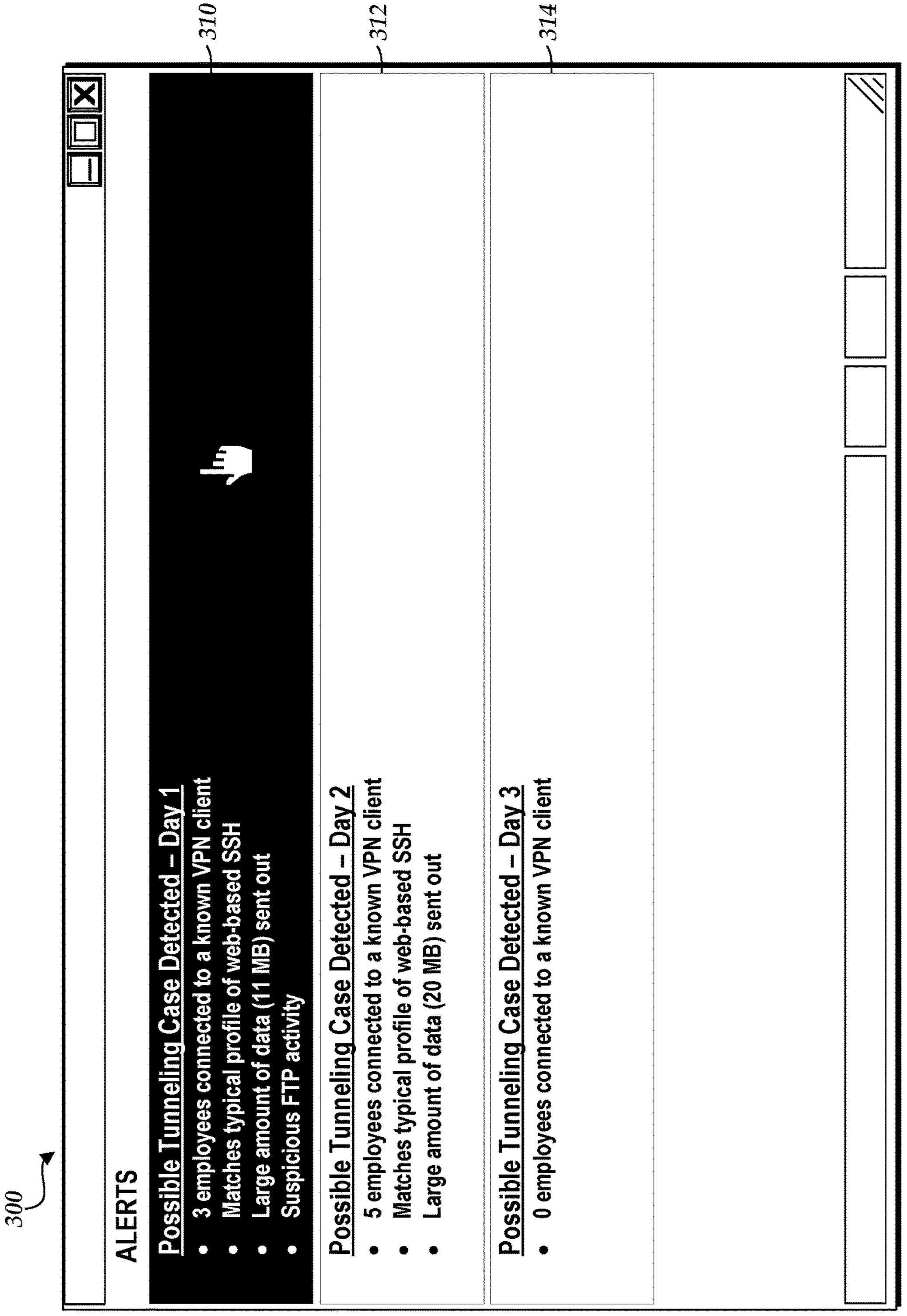

In an embodiment, any of the alerts 310, 312, or 314 in the interface 300 is selectable to view more information. As illustrated in FIG. 3B, the alert 310 is selected.

Figure 3C:
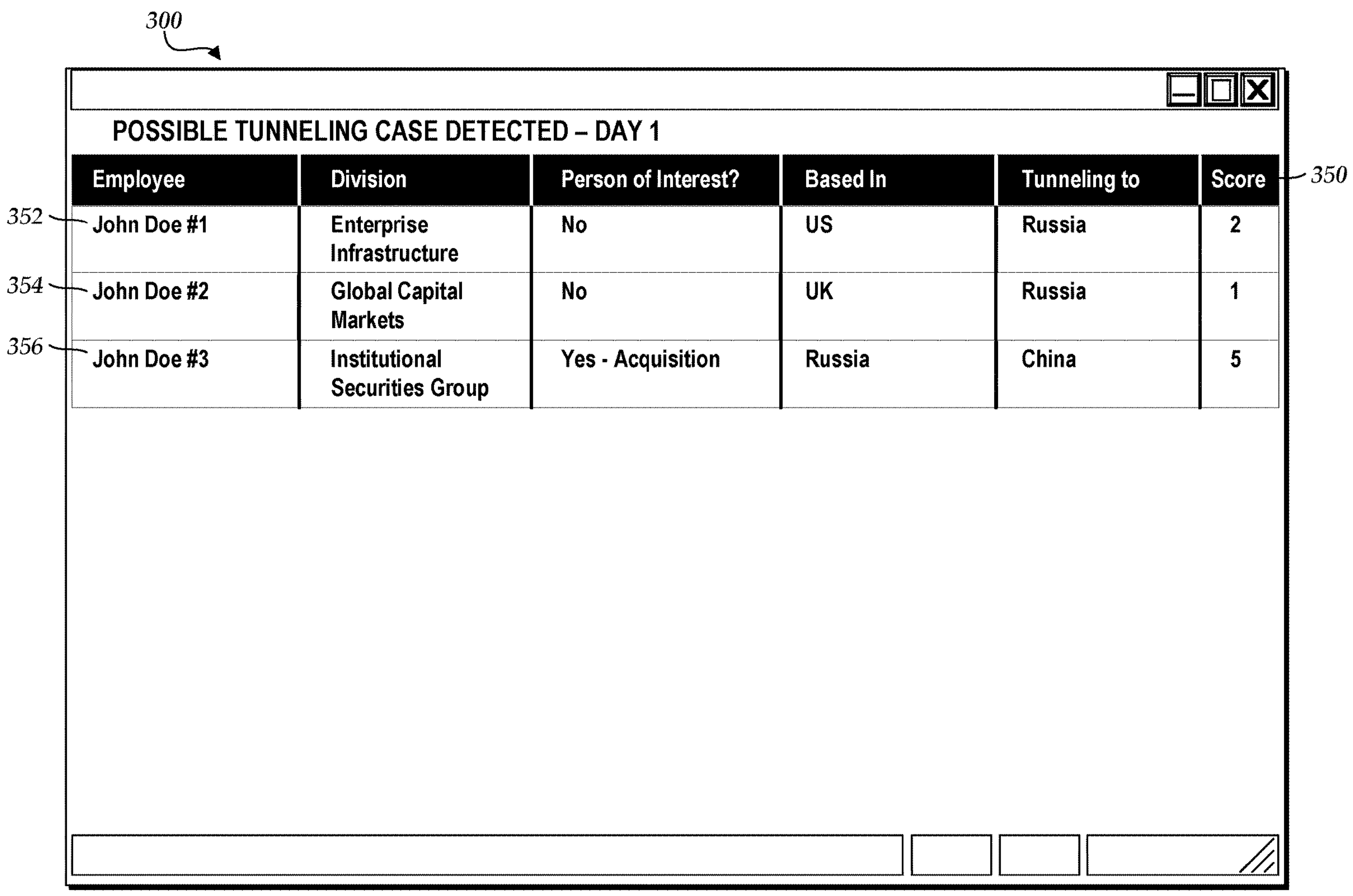

As illustrated in FIG. 3C, once an alert 310, 312, or 314 is selected, additional information can be provided in the interface 300. For example, the interface 300 may include a window 350 that provides information on the user associated with the user device 110, whether the user is a person of interest, a geographic location of the user, a geographic location to where the user tunneled, and/or the risk score associated with the user as determined by the monitoring device 150 as described above. The information may be provided in a row 352, 354, or 356 that is unique to each user. In further embodiments, not shown, the window 350 includes other information associated with the user, the user device 110, and/or the remote device 130. For example, the window 350 may include information on any of the factors used to generate the risk score.

Figure 3D:
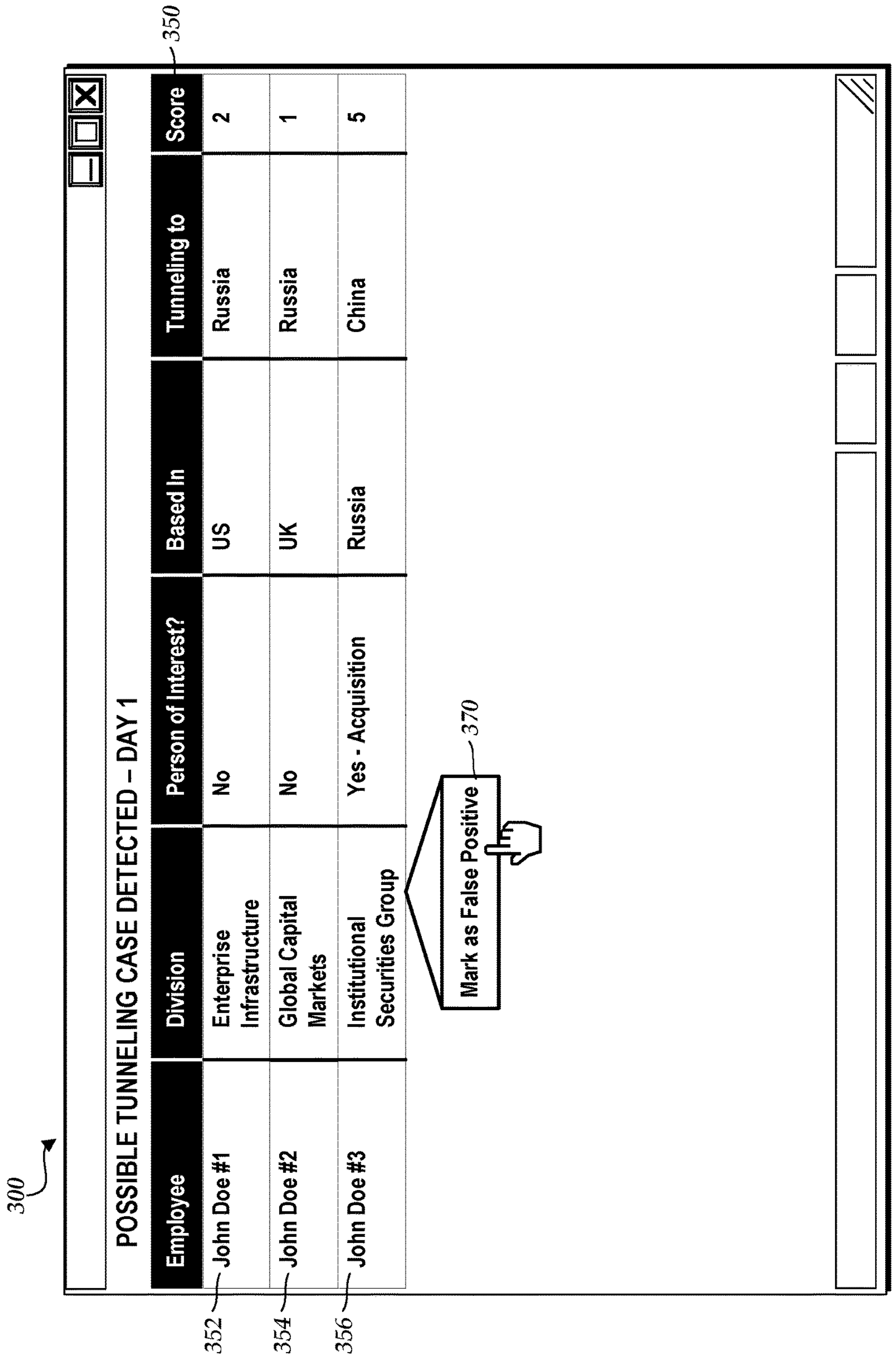

The interface 300 can be manipulated to indicate that an alert 310, 312, or 314 includes a false positive (e.g., while the risk score exceeded the threshold value, no malicious activity is taking place in association with a particular user or monitored device 152). For example, any of rows 352, 354, or 356 can be selected, as illustrated in FIG. 3D. Upon selection, a popup window 370 may appear that allows the IT administrator to mark the alert associated with the user as a false positive. Upon marking the alert as a false positive, the monitoring device 150 may be notified and use the information to adjust the determination of future risk scores. For example, the monitoring device 150 may adjust the weights of one or more factors such that future risk scores are lower when the factors are the same or similar as in the case that was marked a false positive.

FIGS. 3A-3D are not meant to be limiting. The alerts 310, 312, or 314 may be generated and displayed in any manner, such as by the techniques disclosed in Attorney Docket No. PALAN.235A1P5, which is hereby incorporated by reference in its entirety.

Implementation Mechanisms

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, server computer systems, portable computer systems, handheld devices, networking devices or any other device or combination of devices that incorporate hard-wired and/or program logic to implement the techniques.

Computing device(s) are generally controlled and coordinated by operating system software, such as iOS, Android, Chrome OS, Windows XP, Windows Vista, Windows 7, Windows 8, Windows Server, Windows CE, Unix, Linux, SunOS, Solaris, iOS, Blackberry OS, VxWorks, or other compatible operating systems. In other embodiments, the computing device may be controlled by a proprietary operating system. Conventional operating systems control and schedule computer processes for execution, perform memory management, provide file system, networking, I/O services, and provide a user interface functionality, such as a graphical user interface ("GUI"), among other things.

Figure 4:
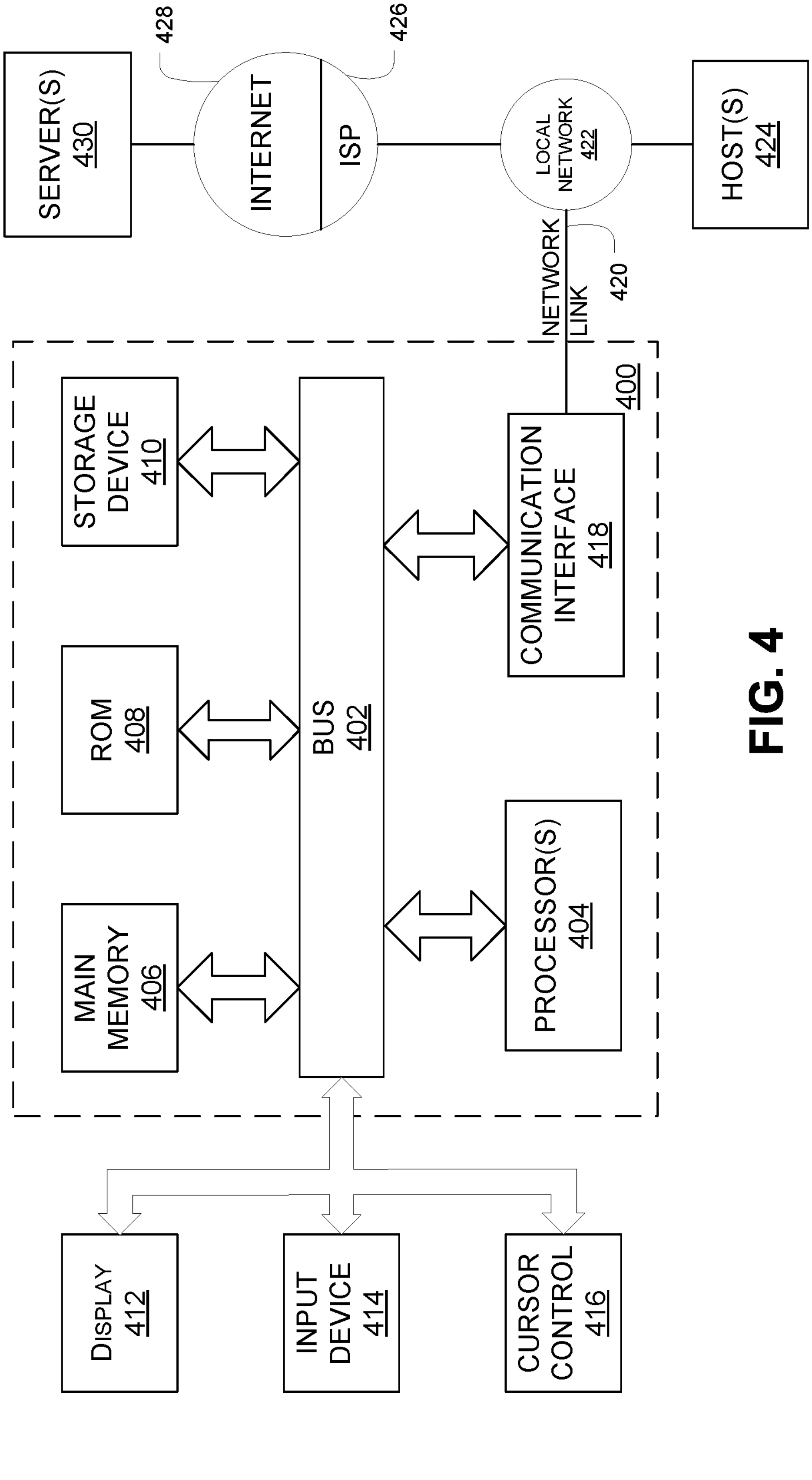
FIG. 4 illustrates a computer system with which certain methods discussed herein may be implemented, according to one embodiment.

For example, FIG. 4 is a block diagram that illustrates a computer system 400 upon which an embodiment may be implemented. For example, any of the computing devices discussed herein, such as the user device 110, the remote device 130, the monitoring device 150, the VPN server 152, the administrator device 154, the VPN logs data structure 156, the proxy server 158, the proxy logs data structure 160, and/or the enterprise device 162 may include some or all of the components and/or functionality of the computer system 400.

Computer system 400 includes a bus 402 or other communication mechanism for communicating information, and a hardware processor, or multiple processors, 404 coupled with bus 402 for processing information. Hardware processor(s) 404 may be, for example, one or more general purpose microprocessors.

Computer system 400 also includes a main memory 406, such as a random access memory (RAM), cache and/or other dynamic storage devices, coupled to bus 402 for storing information and instructions to be executed by processor 404. Main memory 406 also may be used for storing temporary variables or other intermediate information during execution of instructions to be executed by processor 404. Such instructions, when stored in storage media accessible to processor 404, render computer system 400 into a special-purpose machine that is customized to perform the operations specified in the instructions.

Computer system 400 further includes a read only memory (ROM) 408 or other static storage device coupled to bus 402 for storing static information and instructions for processor 404. A storage device 410, such as a magnetic disk, optical disk, or USB thumb drive (Flash drive), etc., is provided and coupled to bus 402 for storing information and instructions.

Computer system 400 may be coupled via bus 402 to a display 412, such as a cathode ray tube (CRT) or LCD display (or touch screen), for displaying information to a computer user. An input device 414, including alphanumeric and other keys, is coupled to bus 402 for communicating information and command selections to processor 404. Another type of user input device is cursor control 416, such as a mouse, a trackball, or cursor direction keys for communicating direction information and command selections to processor 404 and for controlling cursor movement on display 412. This input device typically has two degrees of freedom in two axes, a first axis (e.g., x) and a second axis (e.g., y), that allows the device to specify positions in a plane. In some embodiments, the same direction information and command selections as cursor control may be implemented via receiving touches on a touch screen without a cursor.

Computing system 400 may include a user interface module to implement a GUI that may be stored in a mass storage device as executable software codes that are executed by the computing device(s). This and other modules may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables.

In general, the word "module," as used herein, refers to logic embodied in hardware or firmware, or to a collection of software instructions, possibly having entry and exit points, written in a programming language, such as, for example, Java, Lua, C or C++. A software module may be compiled and linked into an executable program, installed in a dynamic link library, or may be written in an interpreted programming language such as, for example, BASIC, Perl, or Python. It will be appreciated that software modules may be callable from other modules or from themselves, and/or may be invoked in response to detected events or interrupts. Software modules configured for execution on computing devices may be provided on a computer readable medium, such as a compact disc, digital video disc, flash drive, magnetic disc, or any other tangible medium, or as a digital download (and may be originally stored in a compressed or installable format that requires installation, decompression or decryption prior to execution). Such software code may be stored, partially or fully, on a memory device of the executing computing device, for execution by the computing device. Software instructions may be embedded in firmware, such as an EPROM. It will be further appreciated that hardware modules may be comprised of connected logic units, such as gates and flip-flops, and/or may be comprised of programmable units, such as programmable gate arrays or processors. The modules or computing device functionality described herein are preferably implemented as software modules, but may be represented in hardware or firmware. Generally, the modules described herein refer to logical modules that may be combined with other modules or divided into sub-modules despite their physical organization or storage Computer system 400 may implement the techniques described herein using customized hard-wired logic, one or more ASICs or FPGAs, firmware and/or program logic which in combination with the computer system causes or programs computer system 400 to be a special-purpose machine. According to one embodiment, the techniques herein are performed by computer system 400 in response to processor(s) 404 executing one or more sequences of one or more instructions contained in main memory 406. Such instructions may be read into main memory 406 from another storage medium, such as storage device 410. Execution of the sequences of instructions contained in main memory 406 causes processor(s) 404 to perform the process steps described herein. In alternative embodiments, hard-wired circuitry may be used in place of or in combination with software instructions.

The term "non-transitory media," and similar terms, as used herein refers to any media that store data and/or instructions that cause a machine to operate in a specific fashion. Such non-transitory media may comprise non-volatile media and/or volatile media. Non-volatile media includes, for example, optical or magnetic disks, such as storage device 410. Volatile media includes dynamic memory, such as main memory 406. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, and networked versions of the same.

Non-transitory media is distinct from but may be used in conjunction with transmission media. Transmission media participates in transferring information between non-transitory media. For example, transmission media includes coaxial cables, copper wire and fiber optics, including the wires that comprise bus 402. Transmission media can also take the form of acoustic or light waves, such as those generated during radio-wave and infra-red data communications.

Various forms of media may be involved in carrying one or more sequences of one or more instructions to processor 404 for execution. For example, the instructions may initially be carried on a magnetic disk or solid state drive of a remote computer. The remote computer can load the instructions into its dynamic memory and send the instructions over a telephone line using a modem. A modem local to computer system 400 can receive the data on the telephone line and use an infra-red transmitter to convert the data to an infra-red signal. An infra-red detector can receive the data carried in the infra-red signal and appropriate circuitry can place the data on bus 402. Bus 402 carries the data to main memory 406, from which processor 404 retrieves and executes the instructions. The instructions received by main memory 406 may retrieve and execute the instructions. The instructions received by main memory 406 may optionally be stored on storage device 410 either before or after execution by processor 404.

Computer system 400 also includes a communication interface 418 coupled to bus 402. Communication interface 418 provides a two-way data communication coupling to a network link 420 that is connected to a local network 422. For example, communication interface 418 may be an integrated services digital network (ISDN) card, cable modem, satellite modem, or a modem to provide a data communication connection to a corresponding type of telephone line. As another example, communication interface 418 may be a local area network (LAN) card to provide a data communication connection to a compatible LAN (or WAN component to communicated with a WAN). Wireless links may also be implemented. In any such implementation, communication interface 418 sends and receives electrical, electromagnetic or optical signals that carry digital data streams representing various types of information.

Network link 420 typically provides data communication through one or more networks to other data devices. For example, network link 420 may provide a connection through local network 422 to a host computer 424 or to data equipment operated by an Internet Service Provider (ISP) 426. ISP 426 in turn provides data communication services through the world wide packet data communication network now commonly referred to as the "Internet" 428. Local network 422 and Internet 428 both use electrical, electromagnetic or optical signals that carry digital data streams. The signals through the various networks and the signals on network link 420 and through communication interface 418, which carry the digital data to and from computer system 400, are example forms of transmission media.

Computer system 400 can send messages and receive data, including program code, through the network(s), network link 420 and communication interface 418. In the Internet example, a server 430 might transmit a requested code for an application program through Internet 428, ISP 426, local network 422 and communication interface 418.

The received code may be executed by processor 404 as it is received, and/or stored in storage device 410, or other non-volatile storage for later execution.

Terminology

Each of the processes, methods, and algorithms described in the preceding sections may be embodied in, and fully or partially automated by, code modules executed by one or more computer systems or computer processors comprising computer hardware. The processes and algorithms may be implemented partially or wholly in application-specific circuitry.

The various features and processes described above may be used independently of one another, or may be combined in various ways. All possible combinations and subcombinations are intended to fall within the scope of this disclosure. In addition, certain method or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed example embodiments. The example systems and components described herein may be configured differently than described. For example, elements may be added to, removed from, or rearranged compared to the disclosed example embodiments.

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Any process descriptions, elements, or blocks in the flow diagrams described herein and/or depicted in the attached figures should be understood as potentially representing modules, segments, or portions of code which include one or more executable instructions for implementing specific logical functions or steps in the process. Alternate implementations are included within the scope of the embodiments described herein in which elements or functions may be deleted, executed out of order from that shown or discussed, including substantially concurrently or in reverse order, depending on the functionality involved, as would be understood by those skilled in the art.

It should be emphasized that many variations and modifications may be made to the above-described embodiments, the elements of which are to be understood as being among other acceptable examples. All such modifications and variations are intended to be included herein within the scope of this disclosure. The foregoing description details certain embodiments of the invention. It will be appreciated, however, that no matter how detailed the foregoing appears in text, the invention can be practiced in many ways. As is also stated above, it should be noted that the use of particular terminology when describing certain features or aspects of the invention should not be taken to imply that the terminology is being re-defined herein to be restricted to including any specific characteristics of the features or aspects of the invention with which that terminology is associated. The scope of the invention should therefore be construed in accordance with the appended claims and any equivalents thereof.

What is claimed is:

1. A computing system configured to detect and handle malicious network tunneling, the computing system comprising:

a computer processor; and a non-transitory computer readable storage medium storing program instructions configured for execution by the computer processor in order to cause the computing system to:

access a virtual private network (VPN) log including a listing of one or more client IP addresses assigned to a corresponding one or more remote users granted access to a network;

access a data connection log including a listing of one or more remote IP addresses requested via the network;

identify a first IP address included in the VPN log and in the data connection log;

generate a risk score based on at least traffic data associated with the first IP address, the risk score at least partly indicative of a likelihood that the traffic data includes one or more malicious tunneling connections; and terminate a first connection if the risk score exceeds a threshold value.

2. The computing system of claim 1, wherein the risk score is based on at least one of a mismatch between a geographic location of a computing device associated with the first IP address and a geographic location of the network, employment title of a user associated with the first IP address, access rights of the user associated with the first IP address, a time between when a VPN connection associated with the first IP address is established and when a tunneled connection associated with the first IP address is established, an amount of data transferred using the tunneled connection, or a type of uniform resource locator associated with the tunneled connection.

3. The computing system of claim 1, wherein, in connection with a determination that the data connection log indicates that a tunneled connection is established over a first port, the generated risk score is lower than if the tunneled connection is established over a second port.

4. The computing system of claim 1, wherein a VPN connection and a tunneled connection between a computing device associated with the first IP address and the network are encrypted.

5. The computing system of claim 4, wherein the first connection is the tunneled connection.

6. The computing system of claim 1, wherein the non-transitory computer readable storage medium further stores program instructions that cause the computing system to:

generate an alert if the risk score exceeds a threshold value; and process feedback received regarding the generated alert, wherein the feedback affects generation of a second risk score in connection with an identification of a second IP address listed in both the VPN log and in the data connection log having one or more characteristics in a corresponding second traffic data in common with the traffic data associated with the first IP address.

7. The computing system of claim 6, wherein the alert comprises information that at least partly indicates the traffic data that contributed to the risk score exceeding the threshold value.

8. A computer-implemented method comprising:

as implemented by one or more computer systems comprising computer hardware and memory, the one or more computer systems configured with specific executable instructions, accessing a first log including a listing of one or more source addresses assigned to a corresponding one or more remote users granted access to a network;

accessing a second log including a listing of one or more destination addresses requested via the network;

identifying a first address included in both the first log and in the second log;

generating a risk score based on at least traffic data associated with the first address; and terminating a first connection if the risk score exceeds a threshold value.

9. The computer-implemented method of claim 8, wherein the risk score is based on at least one of a mismatch between a geographic location of a computing device associated with the first address and a geographic location of the network, employment title of a user associated with the first address, access rights of the user associated with the first address, a time between when a VPN connection associated with the first address is established and when a tunneled connection associated with the first address is established, an amount of data transferred using the tunneled connection, or a type of uniform resource locator associated with the tunneled connection.

10. The computer-implemented method of claim 8, wherein, in connection with a determination that the second log indicates that a tunneled connection is established over a first port, the generated risk score is lower than if the tunneled connection is established over a second port.

11. The computer-implemented method of claim 8, wherein a VPN connection and a tunneled connection between a computing device associated with the first address and the network are encrypted.

12. The computer-implemented method of claim 8, further comprising:

generating an alert if the risk score exceeds a threshold value receiving feedback regarding the generated alert; and in connection with an identification of a second address listed in both the first log and in the second log, generating a second risk score based on the received feedback.

13. The computer-implemented method of claim 12, wherein the alert comprises information that at least partly indicates the traffic data that contributed to the risk score exceeding the threshold value.

14. The computer-implemented method of claim 12, further comprising generating a graphical representation of the alert for display in a user interface.

15. A non-transitory computer-readable medium comprising one or more program instructions recorded thereon, the instructions configured for execution by a computing system comprising one or more processors in order to cause the computing system to:

access a first log including a listing of one or more source addresses assigned to a corresponding plurality of remote users granted access to a network;

access a second log including a listing of one or more destination addresses requested via the network;

identify a first address included in both the first log and in the second log;

generate a risk score based on at least traffic data associated with the first address; and terminate a first connection if the risk score exceeds a threshold value.

16. The medium of claim 15, wherein the risk score is based on at least one of a mismatch between a geographic location of a computing device associated with the first address and a geographic location of the network, employment title of a user associated with the first address, access rights of the user associated with the first address, a time between when a VPN connection associated with the first address is established and when a tunneled connection associated with the first address is established, an amount of data transferred using the tunneled connection, or a type of uniform resource locator associated with the tunneled connection.

17. The medium of claim 15, wherein, in connection with a determination that the second log indicates that a tunneled connection is established over a first port, the generated risk score is lower than if the tunneled connection is established over a second port.

18. The medium of claim 15, wherein the instructions are further configured to cause the computing system to:

generate an alert if the risk score exceeds a threshold value;

process feedback received regarding the generated alert; and in connection with an identification of a second address listed in both the first log and in the second log, generate a second risk score based on the processed feedback.

19. The medium of claim 18, wherein the alert comprises information that at least partly indicates the traffic data that contributed to the risk score exceeding the threshold value.

20. The medium of claim 18, wherein the instructions are further configured to cause the computing system to generate a graphical representation of the alert for display in a user interface.

* * * * *